Oct. 30, 1934.　　G. W. COCKS ET AL　　1,978,565
ICE CREAM CABINET
Filed Feb. 9, 1933　　3 Sheets-Sheet 1
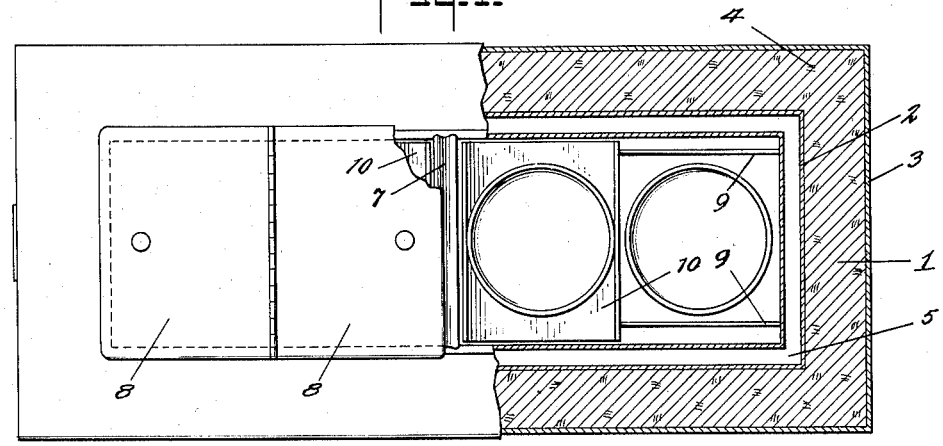
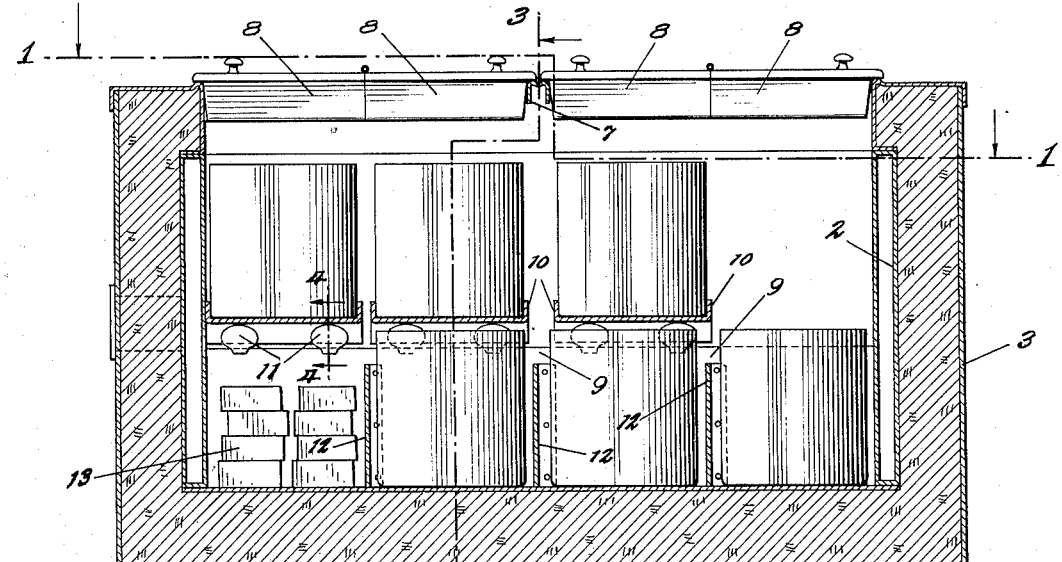
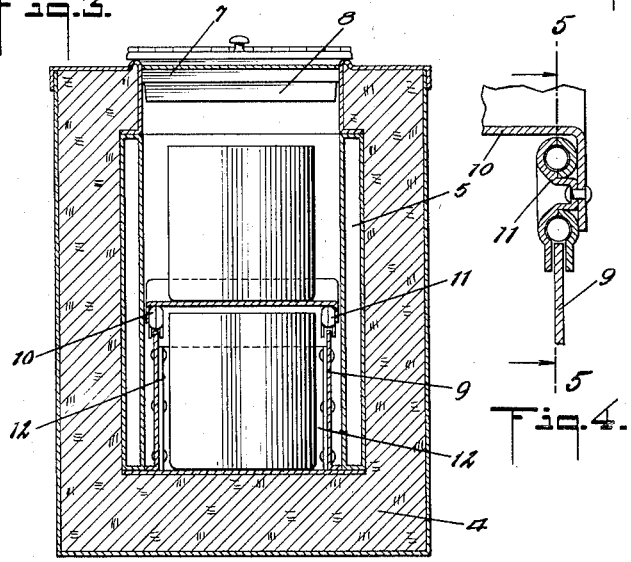
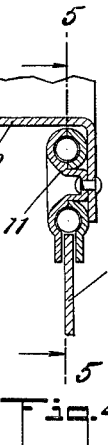
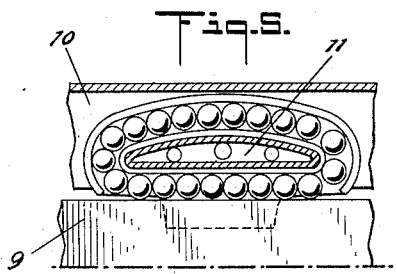
INVENTORS
George W. Cocks
Jacob L. Ginsberg
BY
ATTORNEY

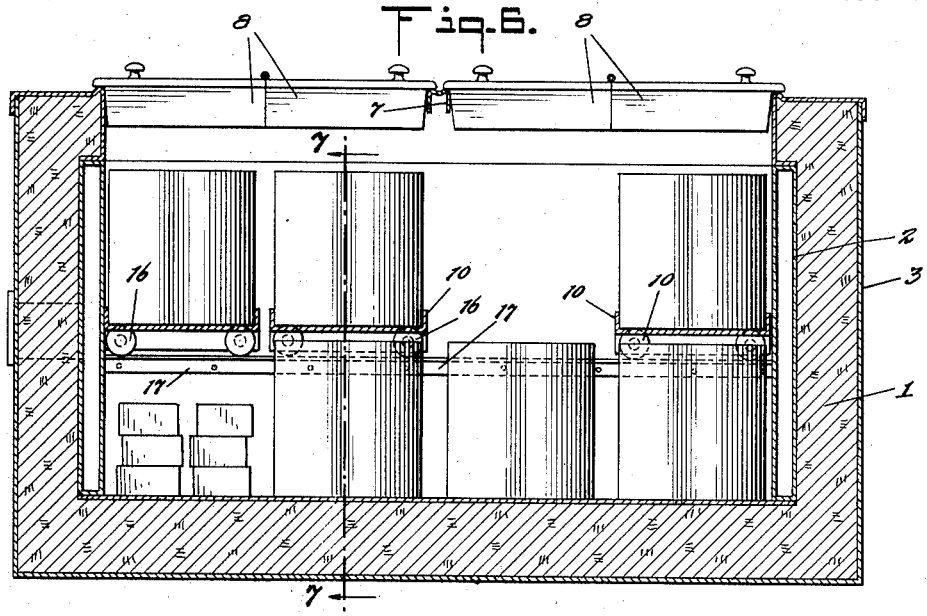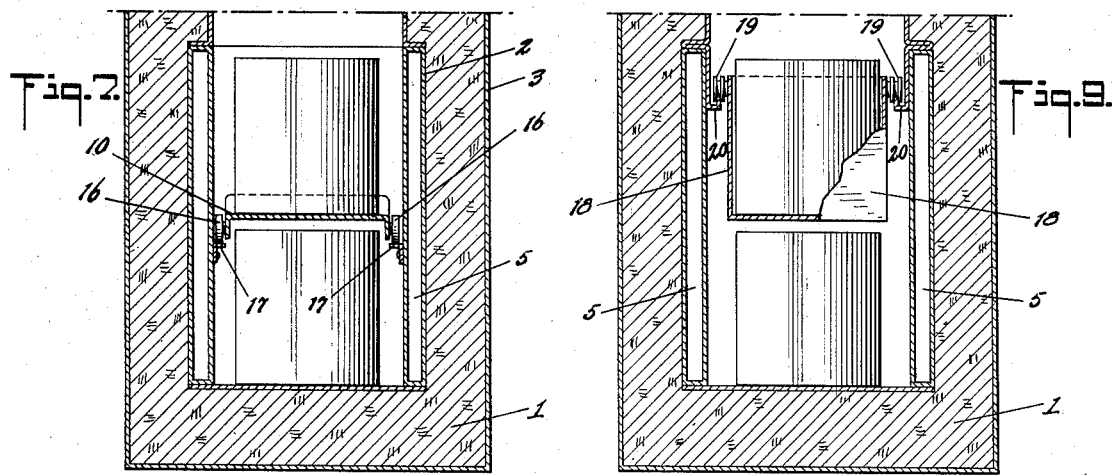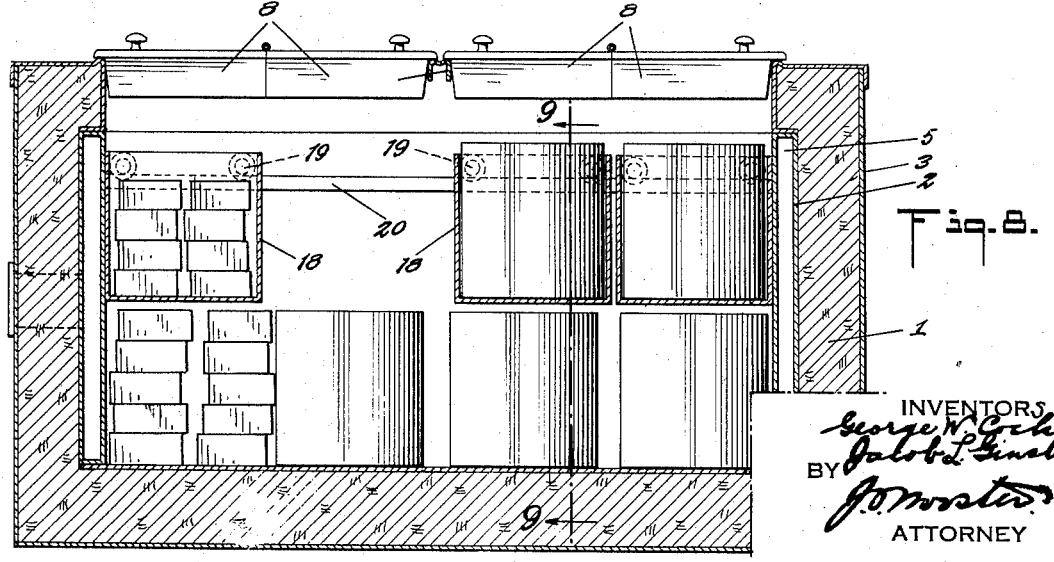

Oct. 30, 1934.  G. W. COCKS ET AL  1,978,565
ICE CREAM CABINET
Filed Feb. 9, 1933   3 Sheets-Sheet 3

INVENTORS
George W. Cocks.
Jacob L. Ginsberg
BY
ATTORNEY

Patented Oct. 30, 1934

1,978,565

UNITED STATES PATENT OFFICE 1,978,565

ICE CREAM CABINET

George W. Cocks, Upper Montclair, N. J., and Jacob L. Ginsberg, Brooklyn, N. Y.; said Ginsberg assignor to said Cocks Application February 9, 1933, Serial No. 655,872

4 Claims. (Cl. 312—150)

This invention relates to cabinets for storage of foods, etc., and has for its objects to provide improved capacity, convenience and accessibility for various articles.

The invention particularly relates to ice cream cabinets wherein it is desired to increase the number of flavors which can be stored in a cabinet of given size and to render any flavor readily accessible, and also to enable larger or smaller packages than a standard ice cream container to be stored in the same cabinet with standard containers.

In ice cream cabinets as now commonly built for soda fountains, etc., refrigeration is provided for a compartment in which standard five gallon ice cream cans are contained. The cabinet is built to contain a can of this size for each flavor and a common type is known as a four hole cabinet providing for four flavors, the cans being accessible from the top of the cabinet. For more flavors, larger cabinets and more refrigeration are required, which becomes inconvenient where a dealer desires to carry a large number of flavors but sells some in greater quantity than others. Also, when a large can is nearly used up, there is a waste of space and yet the can must, for economy, be retained in the cabinet until empty.

According to this invention we propose to permit use of smaller standard cans, that is, say of two and one-half gallon capacity instead of five gallon capacity which will in itself permit an increased number of flavors to be stored in a cabinet of given cubic contents; and to dispose these smaller standard cans in superposed horizontal rows in such manner that the lower cans or packages are readily accessible from the top by shifting an upper can and also by providing means whereby the usually opened lower cans are protected from contamination. A further feature of the invention is that a cabinet is provided wherein a double size can can be readily stored along with half size cans, or packages, so that extreme accessibility and convenience is provided in one cabinet for varying conditions and containers, without requiring unduly expensive refrigeration capacity or excessive bulk.

Thereby, more flavors are made accessible either in packages or in cans than has heretofore been possible, without requiring removal of any can or package from the cabinet space itself to reach others, and produces several economies such as cost of cabinet construction, floor space required, refrigeration cost, as well as sanitation, and accessibility to any desired can or package, and enabling fresher products of a wider range of flavors to be available.

Referring to the accompanying drawings,

Fig. 1 is a partial horizontal section on the line 1—1 of Fig. 2;

Fig. 2 is a vertical section;

Fig. 3 is a transverse section on the line 3—3 of Fig. 2;

Fig. 4 is a sectional detail of a roller bearing;

Fig. 5 is a side elevation;

Fig. 6 is a section similar to Fig. 2 of a slight modification;

Fig. 7 is a transverse section on the line 7—7 of Fig. 6;

Fig. 8 is a longitudinal section similar to Fig. 2 of a further modification;

Fig. 9 is a transverse section on the line 9—9 of Fig. 8;

Figure 10:
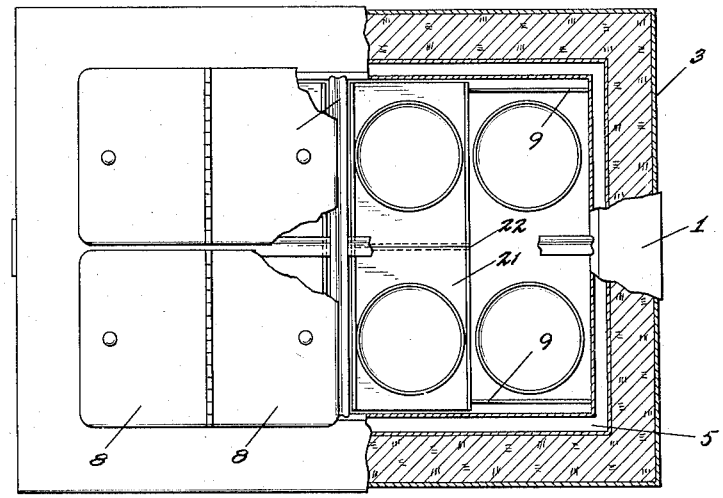
Fig. 10 is a plan view of a modification wherein each carriage carries two cans, and is collapsible or foldable to facilitate removal.

1 represents the box composed of interior and exterior plates 2, 3 separated by heat insulation 4 and within plate 2 is a refrigeration space 5 to be supplied with refrigerant gas or liquid in any desired manner, or by coils, such refrigerating means not being a part of this invention. The top of the cabinet is open and is provided with a cross bar 7 on which pairs of hinged covers 8 are carried, each cover being proportioned to be somewhat wider than the diameter of the vertical can space thereunder. If desired, the usual round holes and round covers may be used. In the lower portion of the cabinet, as seen in Fig. 3, the sides are provided with rails 9 on which carriages 10 travel longitudinally of the cabinet. As shown in Figs. 4 and 5, ease of running is secured by ball bearing casters 11 as shown in Figs. 3, 4, 5. 12 are bottom partitions to separate the bottom cans from each other as seen from Figs. 2 and 3. In the example illustrated there are four bottom storage spaces in a row, which can each contain a can having a different flavor or one compartment can as shown, contain packages 13. The carriages 10 provide supports for the upper cans, and in order to render the lower cans accessible by moving one or more of the upper cans, one carriage is omitted from the top row, thereby rendering any bottom can selectively accessible. The carriages 10 have the further function of acting in effect as covers for the usually open lower cans, and thereby protecting the contents of the latter from dirt, etc., which might fall down therein.

Figs. 6 and 7 are slight modifications from the above in which the carriages 10 are mounted on rollers 16 running on a flat track or angle iron 17.

In Figs. 8 and 9, the upper carriages 18 are in the form of cups supported at their tops on rollers 19 running on tracks 20, which enables packages to be more conveniently carried at the top and also furnishes a somewhat better protection against contamination of the goods in the bottom.

Figure 13:
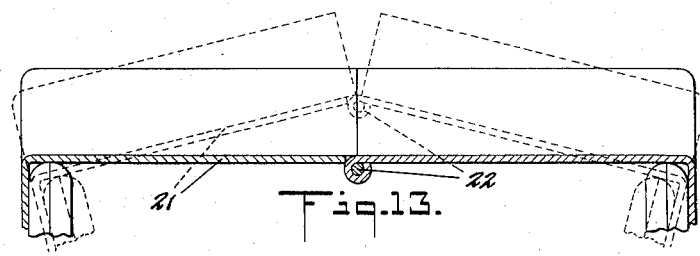
Fig. 13 is an enlarged sectional detail of the collapsible carriage.

In Fig. 10, the carriage 21 is provided with a hinge or hinges 22, shown in detail in Fig. 13 so as to be collapsed to facilitate removal through the top, each carriage being constructed to carry two half-size cans, or packages, jars, etc.

Figure 11:
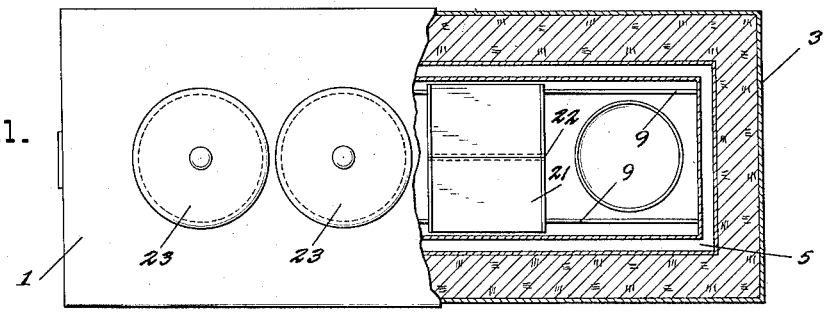
Fig. 11 is a view similar to Fig. 1 in which the carriage is foldable to facilitate removal.

In Fig. 11, a single carriage is provided as in Fig. 1, which carriage is likewise hinged as at 22, and Fig. 11 also shows an alternative form of round cover 23 instead of the rectangular covers 8.

Figure 12:
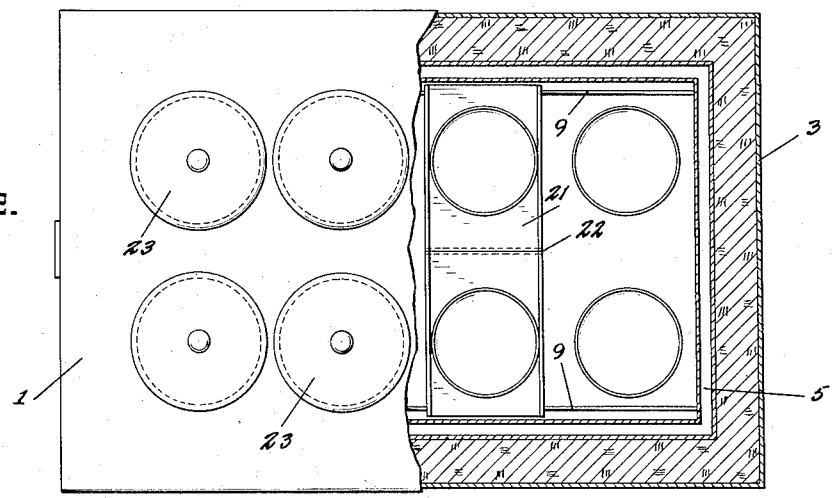
Fig. 12 is a view similar to Fig. 10 showing a modified cover.

Fig. 12 is similar to Fig. 10 showing double width collapsible carriages 21 with round covers 23.

If it be desired to store one or more double length cans at one or both ends, it is simply necessary to take out carriages corresponding through the top hole (which will be of suitable size therefor) or to collapse and remove the carriages, while still leaving one less carriage than the can spaces so that the one or more remaining carriages can be moved as desired to expose the desired flavors.

By this invention it is seen that a larger utility for large and small size cans and packages is provided in a single cabinet, with an increased number of flavors. Also, a given volume of goods can be dispensed at the same time from a smaller size cabinet and at less cost of refrigeration without removing top cans or packages. Also, the top carriages are available for storing various sizes of package ice cream and still movable to permit easy access to the bottom storage spaces and again provide individual storage space for a larger number of flavors, each readily accessible and without taking packages out of the cabinet.

The invention can be embodied in various sizes and lengths and in more than the two tiers herein shown, and can be modified in details without departing from the scope of the appended claims.

The invention claimed is:

1. A cold storage cabinet comprising an insulated box having an open top and closed sides and bottom adapted to contain superposed horizontal rows of food receptacles, a plurality of horizontally movable supports for the upper row, there being a blank space in the upper row to permit selective movement of a support in the upper row to expose a desired lower receptacle, cooling means adjacent the interior space, and top covering means exposing when opened, the desired vertical series of receptacles.

2. A cold storage cabinet comprising a box having an open top and closed sides and bottom adapted to contain superposed horizontal rows of receptacles, opposite rails on the sides of the box above the bottom, a separate support for each upper receptacle movable on said rails, there being one less receptacle support than the number of receptacle spaces to permit selective movement of the upper receptacle supports to expose a desired lower receptacle, cooling means adjacent the interior space, and top covering means exposing when opened, the desired vertical series of receptacles.

3. A storage cabinet comprising a box having an open top and adapted to contain superposed horizontal rows of receptacles, a plurality of horizontally movable, collapsible supports for the upper row, there being a blank space in the upper row to permit selective movement of a support in the upper row to expose a desired lower receptacle, and top covering means exposing when opened, the desired vertical series of receptacles.

4. A storage cabinet comprising a box having an open top and adapted to contain superposed horizontal rows of receptacles, a plurality of horizontally movable double collapsible supports for the upper row, there being a blank space in the upper row to permit selective movement of a support in the upper row to expose a desired lower receptacle, and top covering means exposing when opened, the desired vertical series of receptacles.

GEORGE W. COCKS.
JACOB L. GINSBERG.